(12) United States Patent
Calvin, III

(10) Patent No.: US 10,941,638 B2
(45) Date of Patent: Mar. 9, 2021

(54) TREATMENT ISOLATION IN RESTIMULATIONS WITH INNER WELLBORE CASING

(71) Applicant: HALLIBURTON ENERGY SERVICES, INC., Houston, TX (US)

(72) Inventor: James Eldon Calvin, III, Oklahoma City, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 139 days.

(21) Appl. No.: 16/088,894

(22) PCT Filed: Jun. 13, 2016

(86) PCT No.: PCT/US2016/037206
§ 371 (c)(1),
(2) Date: Sep. 27, 2018

(87) PCT Pub. No.: WO2017/217966
PCT Pub. Date: Dec. 21, 2017

(65) Prior Publication Data
US 2019/0112902 A1 Apr. 18, 2019

(51) Int. Cl.
*E21B 33/12* (2006.01)
*E21B 43/114* (2006.01)
(Continued)

(52) U.S. Cl.
CPC ............ *E21B 43/119* (2013.01); *C09K 8/665* (2013.01); *C09K 8/68* (2013.01); *C09K 8/80* (2013.01);
(Continued)

(58) Field of Classification Search
CPC ...... E21B 33/12; E21B 43/114; E21B 43/116; E21B 43/119; E21B 43/26; E21B 43/261;
(Continued)

(56) References Cited

U.S. PATENT DOCUMENTS 5,273,115 A * 12/1993 Spafford ............... E21B 43/261
166/281
5,894,888 A 4/1999 Wiemers et al.
(Continued)

FOREIGN PATENT DOCUMENTS

WO WO2015/080872 6/2015
WO WO2015/187973 12/2015

OTHER PUBLICATIONS

International Search Report and Written Opinion issued by the Korean Intellectual Property Office regarding International Application No. PCT/US2016/037206, dated Feb. 15, 2017, 12 pgs.
(Continued)

*Primary Examiner* — Daniel P Stephenson
(74) *Attorney, Agent, or Firm* — Haynes and Boone, LLP

(57) ABSTRACT

Methods and systems for restimulating a previously fractured subterranean formation penetrated by a wellbore are described. The methods include plugging existing perforations in an outer casing and existing fractures in the formation with a diverting agent, placing an inner casing in the wellbore while the existing perforations and existing fractures are plugged with the diverting agent, perforating the inner casing and the outer casing to form new perforations, and pumping a fluid through the new perforations to create new fractures in the formation.

20 Claims, 7 Drawing Sheets

(51) Int. Cl.
  *E21B 43/116* (2006.01)
  *E21B 43/119* (2006.01)
  *E21B 43/26* (2006.01)
  *C09K 8/66* (2006.01)
  *C09K 8/80* (2006.01)
  *C09K 8/88* (2006.01)
  *C09K 8/68* (2006.01)

(52) U.S. Cl.
  CPC ............... *C09K 8/88* (2013.01); *E21B 33/12* (2013.01); *E21B 43/114* (2013.01); *E21B 43/116* (2013.01); *E21B 43/26* (2013.01); *E21B 43/261* (2013.01)

(58) Field of Classification Search
  CPC . C09K 8/665; C09K 8/68; C09K 8/80; C09K 8/88
  See application file for complete search history.

(56) References Cited

U.S. PATENT DOCUMENTS

| | | | |
|---|---|---|---|
| 5,990,051 A * | 11/1999 | Ischy | E21B 43/261 507/204 |
| 7,478,676 B2 * | 1/2009 | East, Jr. | E21B 33/1208 166/305.1 |
| 8,109,335 B2 | 2/2012 | Luo et al. | |
| 8,857,513 B2 * | 10/2014 | O'Malley | E21B 43/261 166/281 |
| 9,366,124 B2 * | 6/2016 | Brannon | E21B 43/14 |
| 10,280,698 B2 * | 5/2019 | Potts | E21B 43/11 |
| 10,337,309 B2 * | 7/2019 | Huang | C09K 8/516 |
| 10,364,659 B1 * | 7/2019 | Tolman | E21B 28/00 |
| 2002/0148608 A1 * | 10/2002 | Shaw | E21B 43/25 166/251.1 |
| 2008/0156496 A1 * | 7/2008 | East | E21B 33/1208 166/313 |
| 2009/0151938 A1 | 6/2009 | Conkle et al. | |
| 2013/0186625 A1 | 7/2013 | O'Malley | |
| 2015/0315890 A1 * | 11/2015 | Tolman | E21B 47/06 166/250.01 |
| 2017/0002630 A1 * | 1/2017 | Priezzhev | G06F 16/245 |
| 2018/0112489 A1 * | 4/2018 | Potts | E21B 33/1293 |
| 2018/0283153 A1 * | 10/2018 | Crews | E21B 43/30 |
| 2019/0112902 A1 * | 4/2019 | Calvin | C09K 8/88 |
| 2019/0145250 A1 * | 5/2019 | Ruhle | E21B 47/135 166/250.1 |

OTHER PUBLICATIONS

Canadian Office Action issued by the Canadian Intellectual Property Office, dated Aug. 15, 2019, 6 pages.

* cited by examiner

TREATMENT ISOLATION IN RESTIMULATIONS WITH INNER WELLBORE CASING

CROSS-REFERENCE TO RELATED APPLICATION

The present application is a U.S. National Stage patent application of International Patent Application No. PCT/US2016/037206, filed on Jun. 13, 2016, the benefit of which is claimed and the disclosure of which is incorporated herein by reference in its entirety.

BACKGROUND

The present invention relates to well fracturing operations, and more particularly to methods of isolation of old fractures so as to minimize the loss of treatment fluid during restimulation operations.

Subterranean formations containing hydrocarbons are commonly stimulated by creating fractures therein. That is, a fracturing fluid such as a gelled aqueous fluid is pumped into the formation at a rate and pressure such that fractures are created and extended therein. A propping material such as sand is typically deposited in the fractures so that they are prevented from completely closing when the formation is returned to production and to provide flow passages through which hydrocarbons readily flow to the wellbore.

At some point, the production rate of the formation drops off or undesirable sand or water or other materials are produced, and a decision is made that additional stimulation treatments are needed. For example, it may be desired to perforate one or more zones in a well after one or more other zones have already been perforated. The previously perforated zone(s) need to be isolated, allowing production or injection to proceed via the newly perforated zone(s). However, isolation of the previously perforated zones without a significant decrease in flow area is difficult.

Thus, there is a continuing need for improved restimulation methods, including isolating previously stimulated perforations and newly stimulated perforations.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
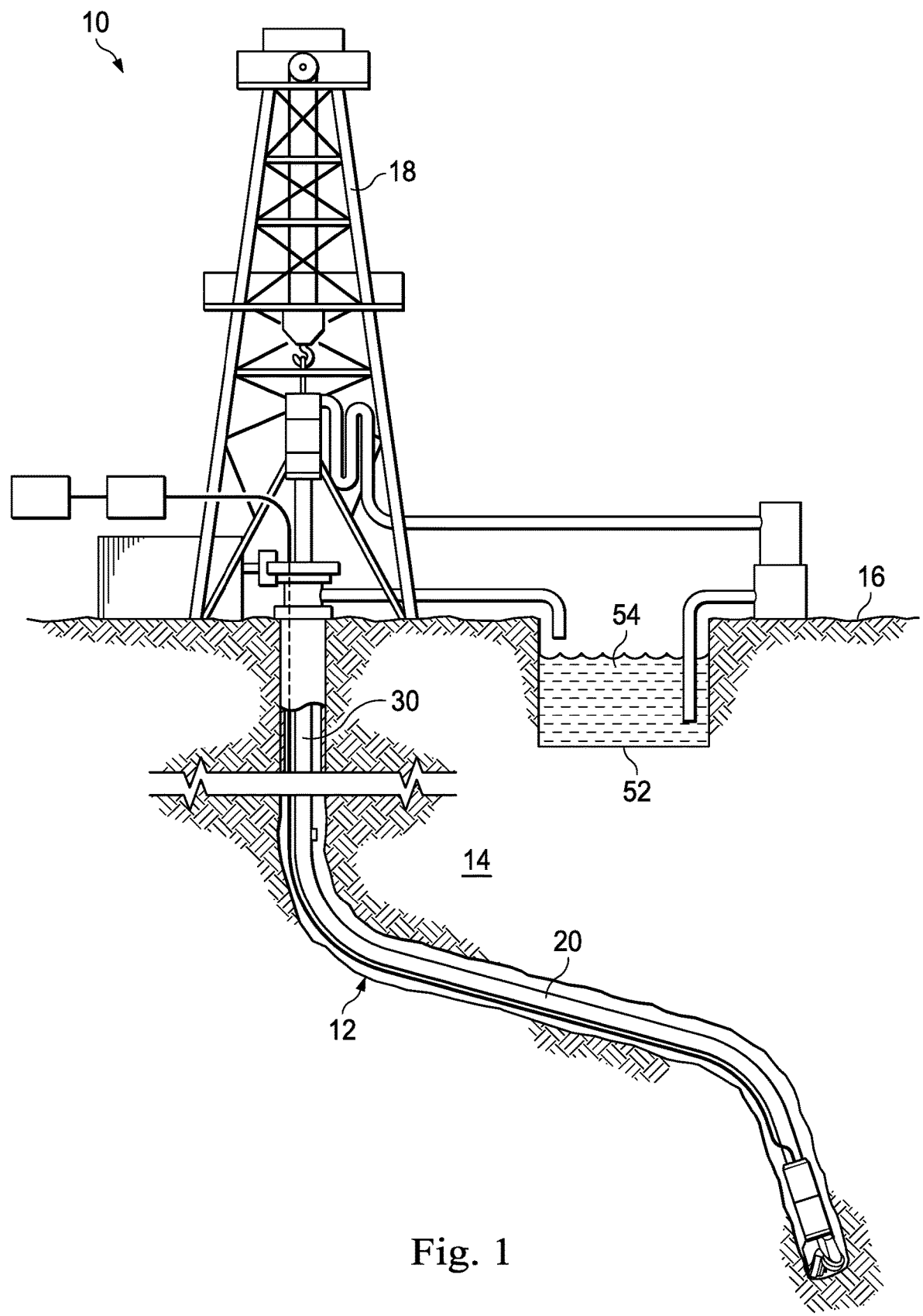
FIG. 1 illustrates a land-based drilling and production system.

According to several exemplary embodiments, the methods of the present invention create effective, repeatable, and consistent isolation between perforation clusters that were previously stimulated during an initial completion of a well and new perforation clusters on the well to be stimulated during a restimulation operation. A perforation cluster can include one or more perforations, and fractures in the subterranean formation can be initiated at or near the perforation clusters. As used herein, "restimulation" encompasses any activities used to restimulate a well after an initial period of production, including but not limited to, refracturing or other stimulation methods, such as remedial chemical treatments for removing fracture damage or acid stimulation treatments.

There are two components to the method. The first component is the utilization of diverting agents (e.g., biodegradable particulates, guar, guar derivatives, cellulose, and/or cellulose derivatives) to isolate old fractures and perforations. The second component is the utilization of annular friction between an inner casing and an outer casing. According to several exemplary embodiments, the outer casing was previously perforated and stimulated through during initial completion, and the inner casing is perforated and stimulated through during restimulation operations.

According to several exemplary embodiments, the methods of the present invention divert treatment fluid away from old fractures and perforations to the new fractures and perforations. The frictional pressure drop in the annulus between the inner casing and outer casing and isolation between the old fractures and new fractures aids in this diversion.

According to several exemplary embodiments, a method of restimulating a previously fractured subterranean formation penetrated by a wellbore is provided. The method includes plugging existing perforations in an outer casing and existing fractures in the formation with a diverting agent, placing an inner casing in the wellbore while the existing perforations and existing fractures are plugged with the diverting agent, perforating the inner casing and the outer casing to form new perforations, and pumping a fluid through the new perforations to create new fractures in the formation. The inner casing may be open-ended or closed-ended. According to several exemplary embodiments, when the inner-casing is open-ended, a plug can be pumped down the casing after placement and seat on a landing collar, making it closed-ended after placement.

According to several exemplary embodiments, a frictional pressure drop exists across an annulus between the inner casing and outer casing. The frictional pressure drop facilitates fluid isolation between the old or existing perforations and fractures and the new perforations and fractures.

According to several exemplary embodiments, the diverting agent includes solid particulates. According to several exemplary embodiments, the solid particulates include biodegradable particulates. According to several exemplary embodiments, the biodegradable particulates include polyester-based particulates.

According to several exemplary embodiments, the diverting agent includes a polymeric material. Suitable polymeric materials include guar, guar derivatives (e.g., hydroxypropyl guar), cellulose, and cellulose derivatives (e.g., hydroxyethyl cellulose).

According to several exemplary embodiments, the method further includes repeating the perforating and pumping steps. According to several exemplary embodiments, the method further includes setting a plug in the wellbore between a first restimulation stage and a second restimulation stage prior to repeating the perforating step. According to several exemplary embodiments, a wireline operated perforating gun or a tubing conveyed perforating gun is used to perforate the inner and outer casing.

According to several exemplary embodiments, plugging the existing perforations and fractures in the formation with a diverting agent includes introducing a treatment fluid including the diverting agent into the formation. The treatment fluid includes any fluid suitable for delivering the diverting agent into the formation through the wellbore.

According to several exemplary embodiments, the method further includes allowing the diverting agent to divert a flow of at least a portion of the fluid from the existing perforations and fractures to the new perforations and fractures.

According to several exemplary embodiments, the diverting agent plugs the existing perforations and fractures from before a time that the inner casing is placed in the wellbore until after restimulation of the formation is completed.

According to several exemplary embodiments, the fluid that is pumped through the new perforations includes a fracturing fluid. Suitable fracturing fluids include gelled or non-gelled aqueous fluids, oil-based fluids, foams and emulsions.

According to several exemplary embodiments, another method of restimulating a previously fractured subterranean formation penetrated by a wellbore is provided. The method includes introducing a treatment fluid including a biodegradable diverting agent into the wellbore, plugging existing perforations in an outer casing and existing fractures in the formation with the biodegradable diverting agent, placing an inner casing in the wellbore while the existing perforations and existing fractures are plugged with the biodegradable diverting agent, perforating the inner casing and the outer casing to form new perforations, and pumping a fluid through the new perforations to create new fractures in the formation adjacent to the new perforations.

According to several exemplary embodiments, the biodegradable diverting agent includes polyester-based particulates.

According to several exemplary embodiments, the method further includes repeating the perforating and pumping steps. According to several exemplary embodiments, the method further comprises setting a plug in the wellbore between a first restimulation stage and a second restimulation stage prior to repeating the perforating step. According to several exemplary embodiments, a plug can also be set towards the toe of the inner casing string before the first restimulation stage to more effectively isolate the first restimulation stage from the inner casing/outer casing annulus.

According to several exemplary embodiments, the biodegradable diverting agent plugs the existing perforations and fractures before re-production of the well begins. According to several exemplary embodiments, the biodegradable diverting agent plugs the existing perforations and fractures from prior to the placement of the inner casing in the wellbore until after restimulation of the formation is completed.

According to several exemplary embodiments, yet another method of restimulating a previously fractured subterranean formation penetrated by a wellbore is provided. The method includes introducing a treatment fluid including a polyester-based biodegradable diverting agent into the wellbore, plugging existing perforations in an outer casing and existing fractures in the formation with the polyester-based biodegradable diverting agent, placing an inner casing in the wellbore while the existing perforations and existing fractures are plugged with the polyester-based biodegradable diverting agent, perforating the inner casing and the outer casing to form new perforations, pumping a fracturing fluid through the new perforations to create new fractures in the formation, and allowing the polyester-based biodegradable diverting agent to divert a flow of at least a portion of the fracturing fluid from the existing perforations and fractures to the new perforations and fractures.

According to several exemplary embodiments, the method further includes repeating the perforating, pumping, and allowing steps.

Advantageously, the described methods provide better isolation between new and old perforation clusters and allow for better control of the stimulation treatment, which allows new portions of a formation to be stimulated effectively and consistently.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system may include various types of tools or equipment 20 supported by rig 18 and disposed in wellbore 12 for performing these activities.

A working or service fluid source 52, such as a storage tank or vessel, may supply a working fluid 54 pumped to the upper end of tubing string 30 and flow through tubing string 30. Working fluid source 52 may supply any fluid utilized in wellbore operations, including without limitation, drilling fluid, cementitious slurry, acidizing fluid, liquid water, steam, hydraulic fracturing fluid, propane, nitrogen, carbon dioxide or some other type of fluid.

According to several exemplary embodiments, a subterranean formation is in need of restimulation. In order to accomplish the restimulation, the existing fractures and perforations are first sealed so that new fractures and perforations can be created.

According to several exemplary embodiments, the existing fractures and perforations are sealed or plugged with a diverting agent. The diverting agent includes any type of solid particulate suitable for bridging or obstructing the existing fractures and perforations. Suitable diverting agents for use in the methods of the present invention include inorganic materials such as rock salts and polymeric materials such as starch, guar, guar derivatives, cellulose, cellulose derivatives, and polyesters.

According to several exemplary embodiments, the diverting agent is degradable. The term "degradable" as used herein means that the diverting agent is degradable due to chemical and/or radical degradation processes such as hydrolysis or oxidation. The term "degrade" as used herein, means to lower in character or quality; to debase. For example, the diverting agent may be said to have degraded when it has undergone a chemical breakdown. Methods of degradation can include melting, hydrolysis, solvolysis, oxidation, or complete dissolution. Suitable degradable diverting agents include those described in U.S. Pat. No. 8,109,335, which is assigned to Halliburton Energy Services, Inc. and is hereby incorporated by reference. Advantageously, once all the desired zones have been fractured, the degradable diverting agents degrade, thereby unplugging fractures for subsequent use in the recovery of hydrocarbons from the subterranean formation.

According to several exemplary embodiments, in choosing the appropriate degradable diverting agent, one of ordinary skill in the art considers the degradation products that will result. For example, an operator may choose the degradable diverting agent such that the resulting degradation products are soluble in the wellbore fluids, and do not adversely affect one or more other operations, treatment components, the formation, or combinations thereof. Additionally, the choice of degradable diverting agent may also depend, at least in part, upon the conditions of the well.

According to several exemplary embodiments, the degradable diverting agent and/or its degradation products are biodegradable, where biodegradable refers to the ability of a material to be decomposed by a living organism or natural processes. According to several exemplary embodiments, the biodegradable diverting agents provide a self-removing solution for an isolation method, as well as leak-off mitigation when placing the inner casing string in the wellbore.

According to several exemplary embodiments, the biodegradable diverting agent includes BioVert® NWB diverting agent, which is commercially available from Halliburton Energy Services, Inc. BioVert® NWB diverting agent is a temporary polyester-based diverting agent that creates an effective chemical diverter capable of providing temporary isolation to newly stimulated perforation clusters. BioVert® NWB diverting agent is self-removing in that it will self-degrade with time and temperature and does not require subsequent intervention. Temperature and in-situ water cause BioVert® NWB diverting agent to degrade to a benign by-product that is compatible with production chemicals.

The diverting agents can be introduced into the formation using any suitable treatment fluid that is applicable to the chosen operation. The term "introducing," as used herein, includes pumping, injecting, pouring, releasing, displacing, spotting, circulating, or otherwise placing a fluid or material within a well, wellbore, or subterranean formation using any suitable manner known in the art. According to several exemplary embodiments, one or more pumps are used to introduce the treatment fluid into the formation. Any type of pump suitable for introducing the treatment fluid with the diverting agent can be used, such as a centrifugal pump or a positive-displacement pump.

Examples of suitable treatment fluids include any known subterranean treatment fluid, including those in high volume and those that are lower in volume (e.g., pills). Non-limiting examples of suitable treatment fluids include foams, gases, aqueous-based fluids, oil-based fluids, brines, and combinations thereof (such as emulsions). These fluids may include any additives that may be necessary for the fluid to perform the desired function or task, provided that these additives do not negatively interact with the diverting agents. Such additives may include gelling agents, gel stabilizers, salts, pH-adjusting agents, corrosion inhibitors, dispersants, flocculants, acids, foaming agents, antifoaming agents, $H_2S$ scavengers, lubricants, particulates (e.g., proppant or gravel), bridging agents, weighting agents, scale inhibitors, biocides, friction reducers, and the like. Suitable additives for a given application will be known to one of ordinary skill in the art.

According to several exemplary embodiments, once the old or existing fractures are sealed, new fractures are created. According to several exemplary embodiments, an inner casing or liner is used in the process of creating new fractures. The inner casing provides mechanical isolation that allows for more accurate placement of restimulation fluids.

According to several exemplary embodiments, a frictional pressure drop exists across the annulus between the inner casing and the outer casing. This pressure drop helps maintain fluid isolation and directs restimulation fluid towards the new fractures. According to several exemplary embodiments, a fluid is pumped through the inner casing whereby a large pressure drop in the fluid takes place between old fracture locations and new fracture locations. This in turn causes most of the fluid to enter the perforations at the location of the new fracture or fractures being formed with only a relatively small amount of the fluid flowing into the previously formed fracture or fractures.

There is no guarantee, however, that the frictional pressure drop required to maintain isolation between existing perforation clusters and new perforation clusters is less than the frictional pressure drop between the existing perforation clusters and the new perforation clusters. Thus, in several exemplary embodiments, the diverting agents provide an additional isolation mechanism. This isolation mechanism becomes more important as the spacing between old perforation clusters and new perforation clusters becomes closer.

Figure 2A:
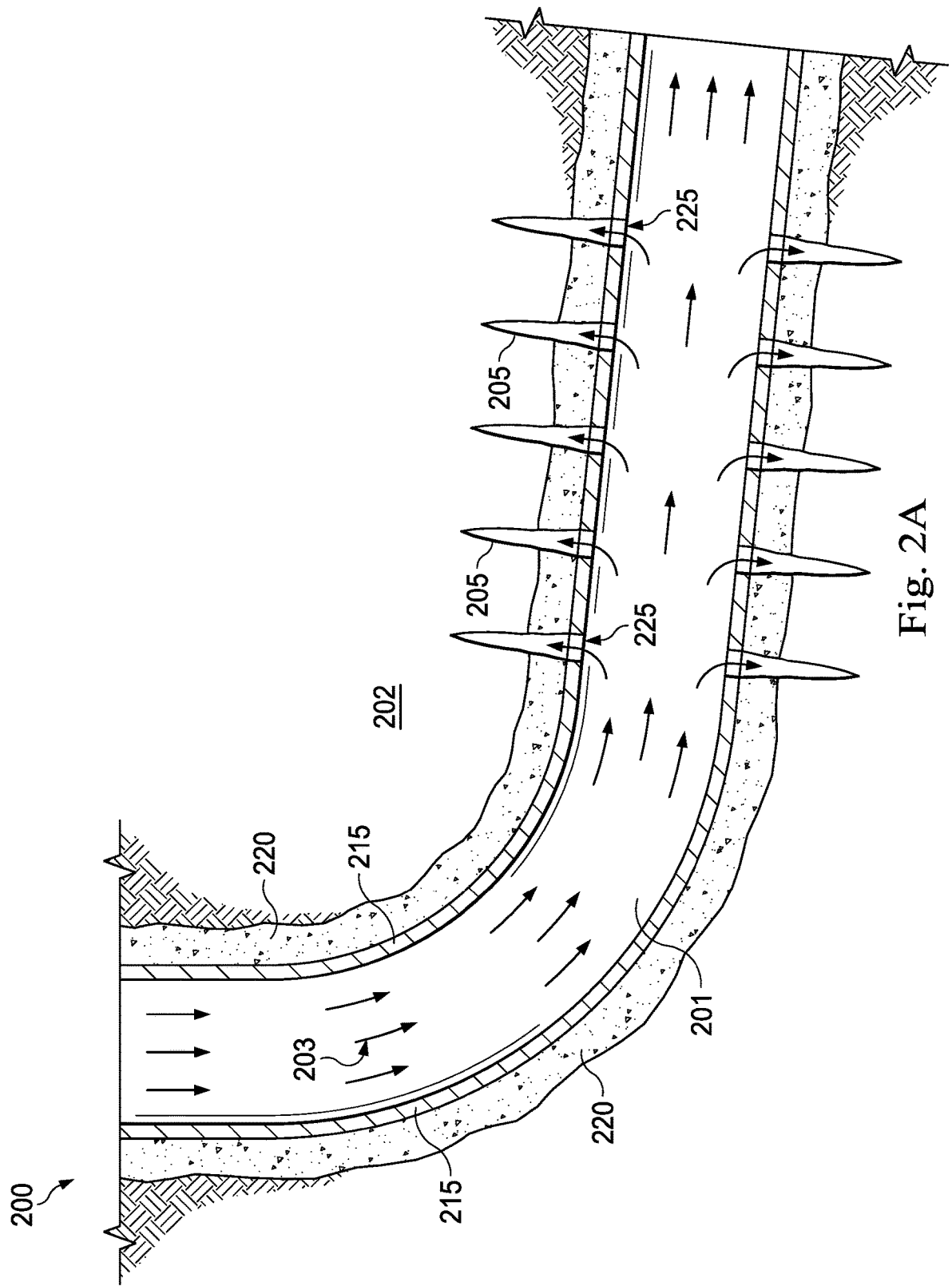
FIGS. 2A-2D illustrate restimulation of a zone of a subterranean formation according to embodiments of the present invention.

Turning now to FIG. 2A, shown is a zone 200 of a wellbore 201 formed through a subterranean formation 202 after an initial completion stage and before placement of the diverting agent. Although the wellbore 201 is shown as deviating to horizontal, the wellbore 201 may include horizontal, vertical, slant, curved, and other types of wellbore geometries and orientations, and fluid may be applied to a subterranean zone surrounding any portion of the wellbore 201.

The zone 200 includes an outer casing 215 that is secured within the wellbore 201 by cement 220 or other means to the wellbore wall. The wellbore 201 can be uncased or can include uncased sections. Perforations 225 formed in the outer casing 215 allow fracturing fluids and/or other materials to flow into old fractures 205 in the formation 202. In cased wells, perforations 225 can be formed using shaped charges, a perforating gun, hydro-jetting and/or other tools.

According to several exemplary embodiments, fluid 203 is pumped into the wellbore 201 and flows into the perforations 225 and old fractures 205, resulting in fluid leak-off into the formation 202.

Figure 2B:
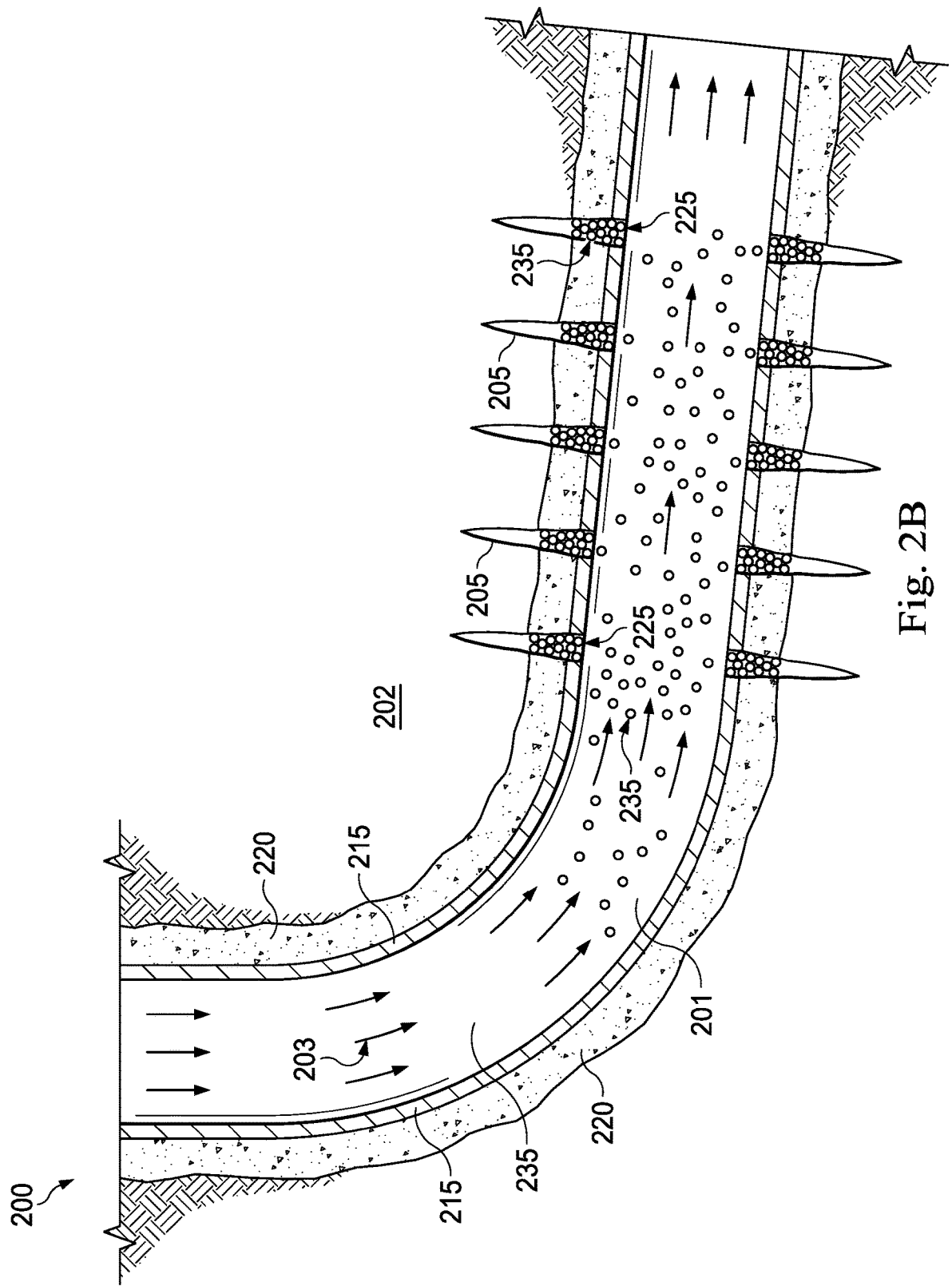

FIG. 2B illustrates the zone 200 after placement of the diverting agent 235 in the perforations 225 and the old fractures 205 and before placement of the inner casing in the wellbore 201. Before an inner casing is placed inside the wellbore 201, the diverting agent 235 is pumped down the wellbore 201 to seal off existing perforations 225 and fractures 205. Thus, the diverting agent 235 acts to plug or partially seal the perforations 225 and fractures 205.

The diverting agent 235 mitigates fluid loss through the existing perforations 225 and fractures 205 into the formation 202, and seal off the existing perforations 225 and fractures 205 to mitigate re-treatment of the old perforations 225 and fractures 205 during the restimulation treatment. The diverting agent 235 is used to seal the original perforations 225 and fractures 205 from prior to the placement of an inner casing until after the restimulation of the formation 202 is concluded.

Figure 2C:
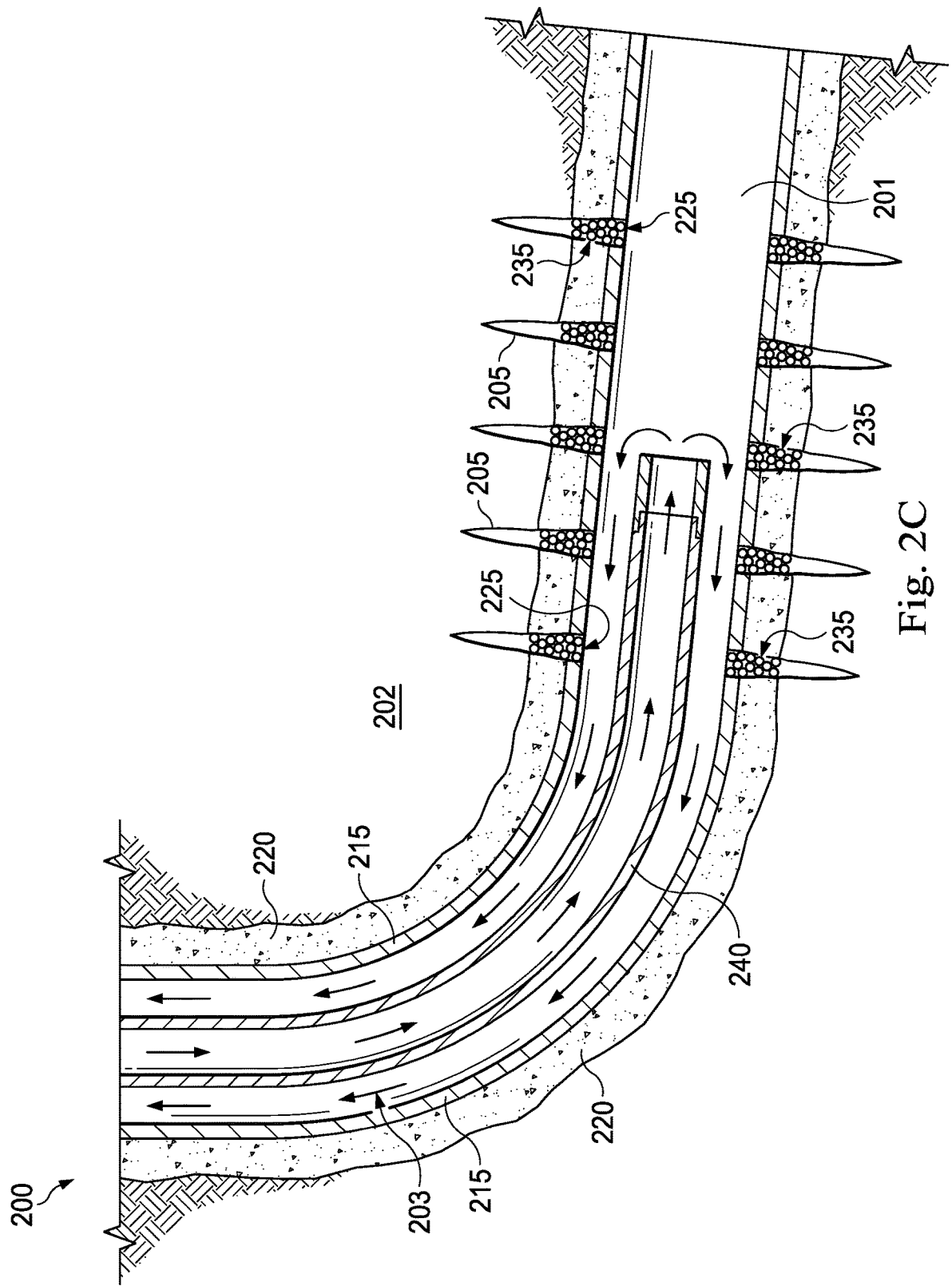

FIG. 2C illustrates the zone 200 during placement of an inner casing 240 in the wellbore 201 after treatment of the formation 202 with the diverting agent 235. According to several exemplary embodiments, an uncemented solid inner casing 240 having an open end is placed in the wellbore 201 and secured. Typically, one end of the inner casing 240 is hung from a larger diameter casing, which may or may not be bonded to the walls of the wellbore 201 by cement.

According to several exemplary embodiments, the inner casing 240 is placed in the wellbore 201 so that it reaches the bottom of the wellbore 201.

Once the inner casing 240 is secured within the wellbore 201, both the inner casing 240 and outer casing 215 are perforated using any suitable method known in the art. For example, tubing conveyed perforating (TCP) techniques or wireline perforating may be used. TCP techniques are the most common methods for perforating the first stage of a restimulation, but wireline perforating can be used if fluid can move freely from the inner casing 240 and wellbore 201 through the initial perforations 225 (e.g., if not all the original perforations 225 were sealed with diverting agent 235 before placement of the inner casing 240).

According to several exemplary embodiments, a conventional perforating gun is moved into and through the inner casing 240 to a selected position spaced a desired distance from the previously created perforations 225 and fractures 205. The perforating gun is then operated whereby new perforations 245 (shown in FIG. 2D) are formed through the solid inner casing 240 and the outer casing 215.

According to several exemplary embodiments, the perforating gun can take a variety of conventional forms. For example, the perforating gun may be a wireline operated perforating gun that is pumped into and through the inner casing 240. Other forms of perforating guns known to those of ordinary skill in the art can also be used such as TCP guns (e.g., coiled TCP guns). Other means of forming openings in the inner casing 240 and outer casing 215 can also be used, such as a hydrojet cutting tool.

Figure 2D:
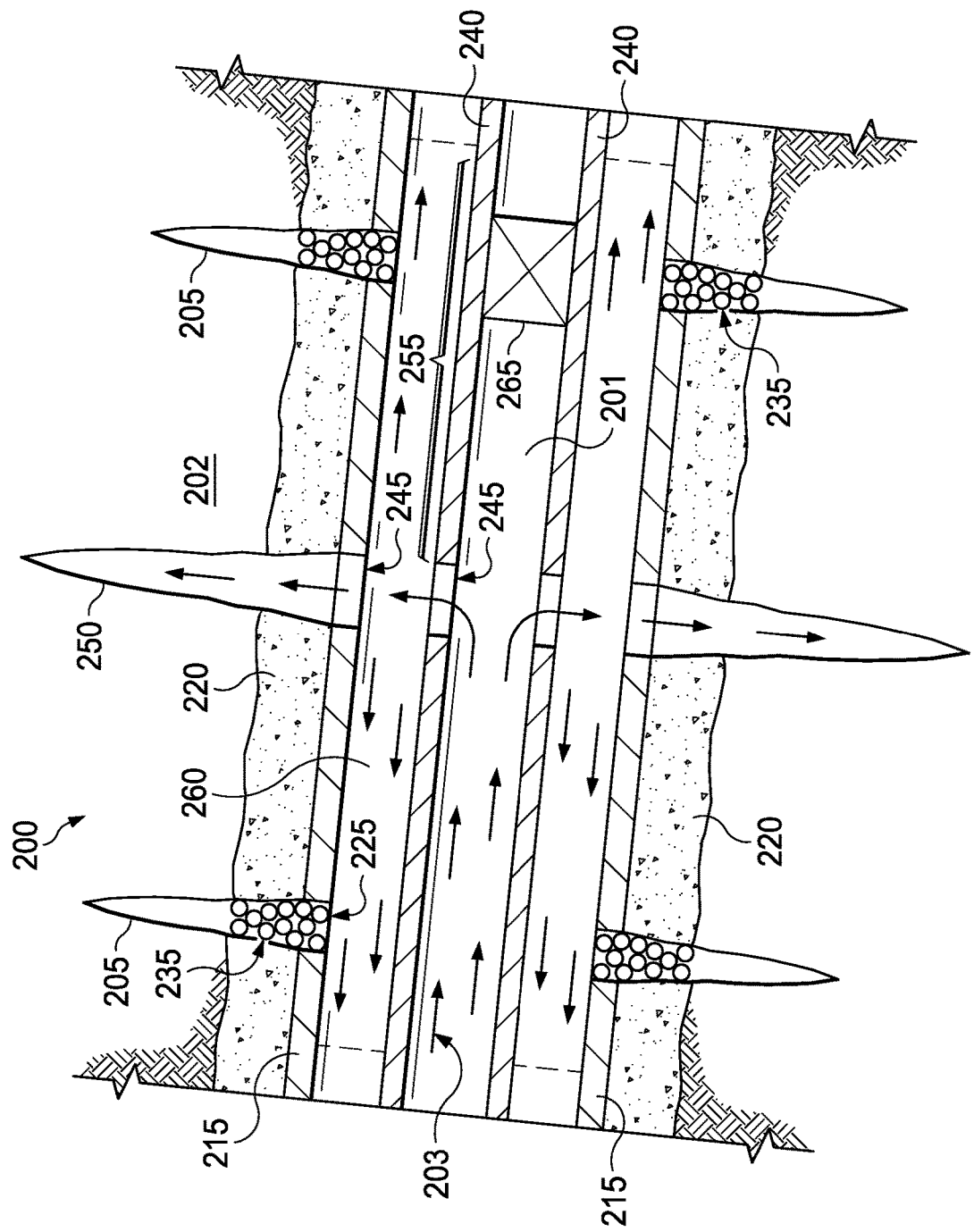

FIG. 2D illustrates the zone 200 during restimulation of the formation 202 after the inner casing 240 and outer casing 215 have been perforated. Once the inner casing 240 has been placed in the wellbore 201 and both the inner casing 240 and outer casing 215 perforated, a fluid 203 is pumped through the inner casing 240. The fluid 203 flows through the new perforations 245 in the inner casing 240 and outer casing 215 to initiate and reach new fractures 250. The fluid 203 is pumped at a rate and pressure sufficient to create and extend the new fractures 250. A frictional pressure drop is observed across a portion 255 of the annulus 260 between the inner casing 240 and the outer casing 215, which helps direct fluid 203 to new fractures 250. As a result, new fractures 250 are created and extend in the formation 202 adjacent to the new perforations 245 of the outer casing 215. A plug 265 may then be placed in the wellbore 201 to separate various stages of restimulation and production zones for stimulation such as fracturing or acid treatment.

According to several exemplary embodiments, the fluid 203 includes a fracturing fluid. A variety of fracturing fluids can be utilized including gelled or non-gelled aqueous fluids, oil-based fluids, foams and emulsions. When the formation 202 being fractured is a carbonate or other formation susceptible to acidizing treatments, the fracturing fluid can be an aqueous acid solution, i.e., a solution of water and one or more acids. In other fracturing applications, the fracturing fluid can be an aqueous or other suitable fracturing fluid known to those of ordinary skill in the art.

The water used to form an aqueous fracturing fluid can be any aqueous fluid that does not adversely react with other components of the fracturing fluid. For example, the water can be fresh water, brines, salt solutions and the like.

When the fracturing fluid is an aqueous acid solution, the acid may be selected from the group consisting of hydrochloric acid, hydrofluoric acid, formic acid, acetic acid, citric acid, glycolic acid and mixtures thereof. The acid is typically present in an amount in the range of from about 1% to about 28% by weight of the acid solution, for example, from about 5% to about 15%. As will be understood by those of ordinary skill in the art, the aqueous acid solution can include a variety of additives such as metal corrosion inhibitors, corrosion inhibitor intensifiers, sulfide scavengers, solvents, surfactants and other components commonly used in acidizing compositions.

When the fracturing fluid is an aqueous fluid with or without acid, it typically includes one or more additives for increasing the viscosity of the fracturing fluid that lowers fluid loss, increases the ability of the fluid to carry propping agents such as sand and increases the friction pressure of the fluid to thereby create a higher pressure drop as the fluid is pumped through the inner casing 240. For example, viscosity increasing additives such as gelling agents, crosslinkers and the like, as well as gel breakers can be included in the fracturing fluid. The aqueous fracturing fluids can also include one or more of a variety of well-known additives such as gel stabilizers, fluid loss control additives, clay swelling reducing additives (clay stabilizers), bactericides and the like.

According to several exemplary embodiments, the inner casing 240 and outer casing 215 are perforated again (in a different area than the perforations 245) according to the methods described above. Fluid is again pumped through the inner casing 240 and outer casing 215 to create and extend fractures formed adjacent to the new perforations in the outer casing 215.

According to several exemplary embodiments, the inner casing 240 and outer casing 215 are perforated a third time, and fluid is pumped through the inner casing 240 and outer casing 215 to create and extend fractures formed adjacent to the new perforations in the outer casing 215.

As will now be understood, the steps of forming perforations in the inner casing and the outer casing and pumping a fluid through the formed perforations to create one or more fractures are repeated as many times as is necessary to produce the desired number of spaced fractures or sets of fractures extending from the wellbore 201 into the formation 202 and until the restimulation of the formation is concluded. Sealing mechanisms may be used to isolate the previously formed fracture or fractures during the formation of the additional fracture or fractures.

The newly formed fractures are propagated or extended by continued fluid injection and using either propping agents or acidizing fluids, or any other known technique for holding the fractures open and conductive to fluid flow at a later time. The fractures can then be plugged or partially sealed using the same techniques as described above. The method can be repeated where it is desired to fracture additional zones within the subterranean formation 202.

Figure 3:
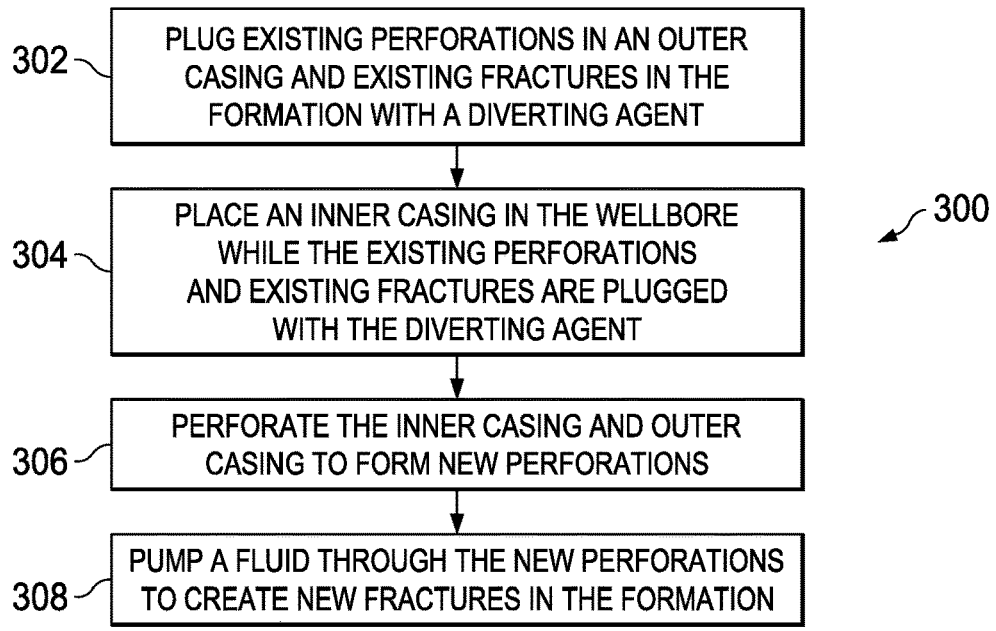
FIG. 3 depicts a method of restimulating a previously fractured subterranean formation according to embodiments of the present invention.

According to several exemplary embodiments, a method of restimulating a previously fractured subterranean formation penetrated by a wellbore is provided. Turning now to FIG. 3, the method 300 includes plugging existing perforations in an outer casing and existing fractures in the formation with a diverting agent in step 302, placing an inner casing in the wellbore while the existing perforations and existing fractures are plugged with the diverting agent in step 304, perforating the inner casing and the outer casing to form new perforations in step 306, and pumping a fluid through the new perforations to create new fractures in the formation at step 308.

Figure 4:
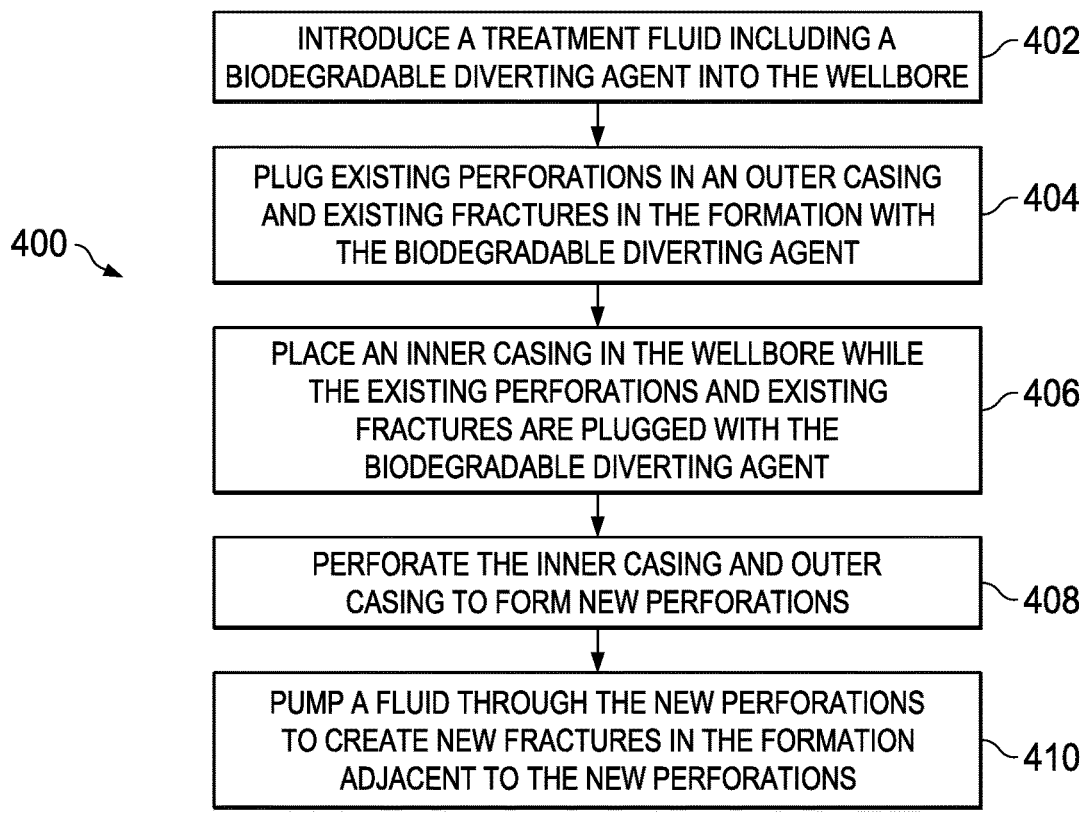
FIG. 4 depicts another method of restimulating a previously fractured subterranean formation according to embodiments of the present invention.

Turning now to FIG. 4, another method 400 of restimulating a previously fractured subterranean formation penetrated by a wellbore is provided. The method includes introducing a treatment fluid including a biodegradable diverting agent into the wellbore at step 402, plugging existing perforations in an outer casing and existing fractures in the formation with the biodegradable diverting agent in step 404, placing an inner casing in the wellbore while the existing perforations and existing fractures are plugged with the biodegradable diverting agent in step 406, perforating the inner casing and the outer casing to form new perforations in step 408, and pumping a fluid through the new perforations to create new fractures in the formation adjacent to the new perforations in step 410.

Figure 5:
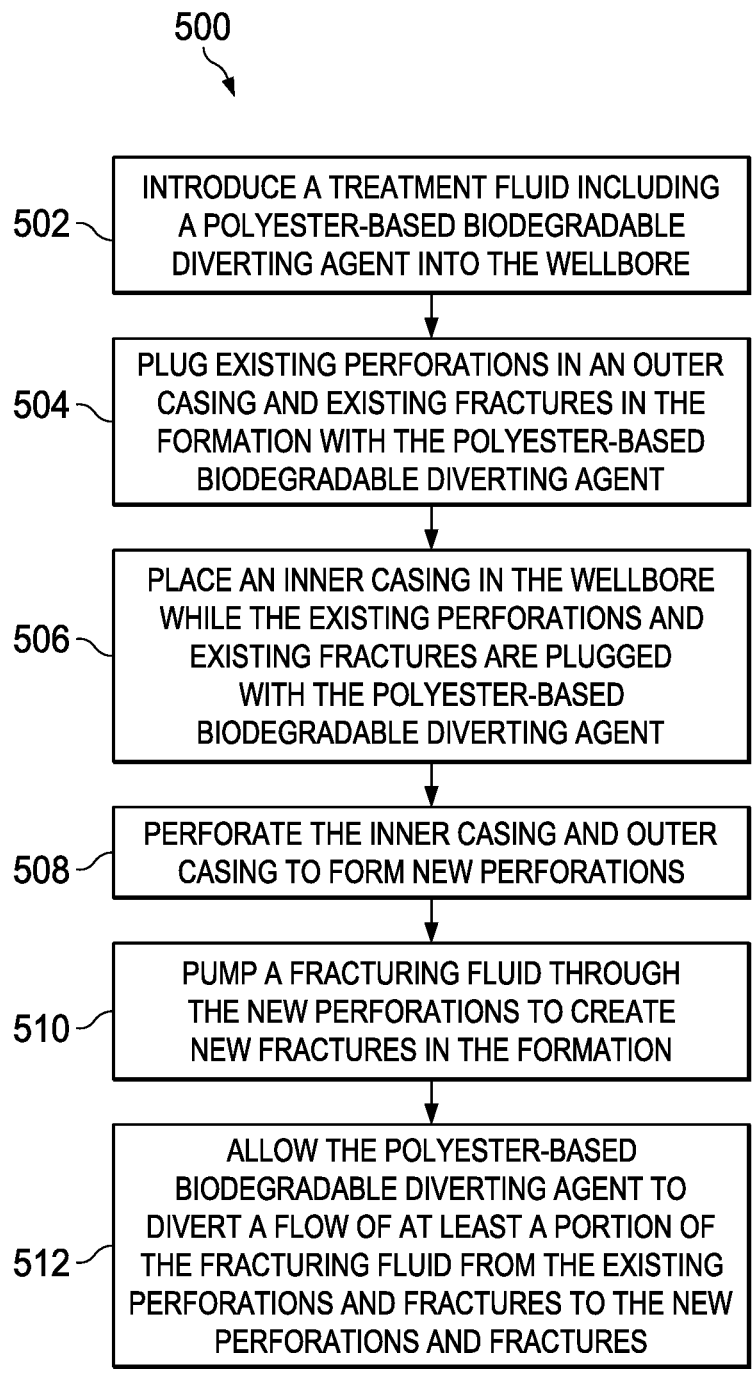
FIG. 5 depicts yet another method of restimulating a previously fractured subterranean formation according to embodiments of the present invention.

FIG. 5 illustrates yet another method 500 of restimulating a previously fractured subterranean formation penetrated by a wellbore. The method includes introducing a treatment fluid including a polyester-based biodegradable diverting agent into the wellbore in step 502, plugging existing perforations in an outer casing and existing fractures in the formation with the polyester-based biodegradable diverting agent in step 504, placing an inner casing in the wellbore while the existing perforations and existing fractures are plugged with the polyester-based biodegradable diverting agent in step 506, perforating the inner casing and the outer casing to form new perforations in step 508, pumping a fracturing fluid through the new perforations to create new fractures in the formation in step 510, and allowing the polyester-based biodegradable diverting agent to divert a flow of at least a portion of the fracturing fluid from the existing perforations and fractures to the new perforations and fractures in step 512.

While both mechanical isolation and diversion materials have been used in restimulation treatments in the past, it is difficult to gain control of where fluid is moving no matter how much diverting agent is pumped or how it is pumped. There are many reasons why controlling fluid flow is so difficult in a refracturing situation. Multiple entry points for fluid to leak-off into the formation and fluid momentum changes as the lateral is traversed with stimulation fluid are just two examples. One sure way to gain control of the wellbore and where the fluid travels is to use some form of mechanical isolation.

A liner or inner casing string is a good start, but there is only a frictional pressure drop across the annulus of the inner and outer casing strings for fluid isolation. Moreover, the annular pressure drop is only good enough to provide isolation if the distance between the old perforation clusters and the new perforation clusters provides a sufficient pressure drop.

The diverting agent provides an additional isolation mechanism and acts in concert with the inner casing string. The inner casing string allows for more control of where the fluid is coming, and when coupled with the diverting agent, provides a two pronged system for sufficient isolation between perforation clusters and effective restimulation of the formation.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of restimulating a previously fractured subterranean formation penetrated by a wellbore comprising:

plugging existing perforations in an outer casing and existing fractures in the formation with a diverting agent, wherein the diverting agent comprises guar or a guar derivative;

after plugging the existing perforations and existing fractures, placing an inner casing in the wellbore;

perforating the inner casing and the outer casing to form new perforations;

pumping a fluid through the new perforations to create new fractures in the formation.

2. The method of claim 1, wherein the diverting agent further comprises solid particulates.

3. The method of claim 2, wherein the solid particulates comprise biodegradable particulates.

4. The method of claim 3, wherein the biodegradable particulates comprise polyester-based particulates.

5. The method of claim 1, further comprising repeating the perforating and pumping steps.

6. The method of claim 5, further comprising setting a plug in the wellbore between a first restimulation stage and a second restimulation stage prior to repeating the perforating step.

7. The method of claim 1, wherein plugging the existing perforations and existing fractures in the formation with a diverting agent comprises introducing a treatment fluid comprising the diverting agent into the formation.

8. The method of claim 1, further comprising allowing the diverting agent to divert a flow of at least a portion of the fluid from the existing perforations and existing fractures to the new perforations and new fractures.

9. The method of claim 1, wherein the diverting agent plugs the existing perforations and existing fractures until after restimulation of the formation is completed.

10. The method of claim 1, wherein a frictional pressure drop exists across an annulus between the inner casing and outer casing.

11. The method of claim 1, wherein a wireline operated perforating gun or a tubing conveyed perforating gun is used to perforate the inner and outer casing.

12. The method of claim 1, wherein the fluid comprises a fracturing fluid.

13. The method of claim 12, wherein the fracturing fluid comprises a gelled or non-gelled aqueous fluid, an oil-based fluid, a foam, or an emulsion.

14. A method of restimulating a previously fractured subterranean formation penetrated by a wellbore comprising:

introducing a treatment fluid comprising a diverting agent and a biodegradable diverting agent into the wellbore, wherein the diverting agent comprises guar or a guar derivative;

plugging existing perforations in an outer casing and existing fractures in the formation with the diverting agent and the biodegradable diverting agent;

after plugging the existing perforations and existing fractures, placing an inner casing in the wellbore;

perforating the inner casing and the outer casing to form new perforations; and pumping a fluid through the new perforations to create new fractures in the formation adjacent to the new perforations.

15. The method of claim 14, wherein the biodegradable diverting agent comprises polyester-based particulates.

16. The method of claim 15, further comprising repeating the perforating and pumping steps.

17. The method of claim 16, further comprising setting a plug in the wellbore between a first restimulation stage and a second restimulation stage prior to repeating the perforating step.

18. The method of claim 15, wherein the diverting agent and the biodegradable diverting agent plug the existing perforations and existing fractures until after restimulation of the formation is completed.

19. The method of claim 15, wherein a pump is used to introduce the treatment fluid.

20. A method of restimulating a previously fractured subterranean formation penetrated by a wellbore comprising:
- introducing a treatment fluid comprising a diverting agent and a polyester-based biodegradable diverting agent into the wellbore, wherein the diverting agent comprises guar or a guar derivative;
- plugging existing perforations in an outer casing and existing fractures in the formation with the diverting agent and the polyester-based biodegradable diverting agent;
- after plugging the existing perforations and existing fractures, placing an inner casing in the wellbore;
- perforating the inner casing and the outer casing to form new perforations;
- pumping a fracturing fluid through the new perforations to create new fractures in the formation; and allowing the diverting agent and the polyester-based biodegradable diverting agent to divert a flow of at least a portion of the fracturing fluid from the existing perforations and fractures to the new perforations and fractures.

\* \* \* \* \*